United States Patent Office 3,384,473
Patented May 21, 1968

3,384,473
DERIVATIVES OF N-PHENYL-N-BENZOYL UREAS AS HERBICIDES
Daniel Pillon, Lyon, and Pierre Poignant, Saint-Rambert-l'Ile-Barbe, France, assignors to Société dite: Pechiney-Progil, Paris, France
No Drawing. Filed Oct. 23, 1964, Ser. No. 406,171
Claims priority, application France, Oct. 25, 1963, 951,808
9 Claims. (Cl. 71—120)

ABSTRACT OF THE DISCLOSURE

The growth of plants is controlled by using as a herbicidal agent an N-phenyl-N-benzoyl urea in which at least one hydrogen on the second urea nitrogen is replaced by at least one alkyl, alkoxy, alkenyl or alkynyl group containing less than 5 carbon atoms. The benzoyl group can be substituted by lower alkyl or alkoxy groups, halogen, nitro, or nitrile.

---

The present invention relates to a new process for the destruction or control of weeds.

It also relates, as new products, to the compositions of products employed in this process.

The active compositions according to the invention are substituted ureas, characterized in that one of the nitrogen atoms carries at least one lower aliphatic radical, while the other nitrogen atom carries a phenyl group and a benzoyl group. The aromatic rings may themselves carry several substitutions, in accordance with the general formula:

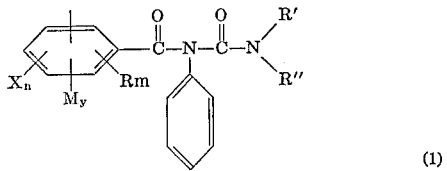

(1)

in which:

X represents a halogen and $n$ is an integer chosen between 0 and 4.
R represents an alkyl, alkoxy, alkenyl or alkynyl group containing fewer than 5 carbon atoms and $m$ is an integer chosen between 0 and 3.
R′ represents a hydrogen atom or an alkyl group, containing fewer than 5 carbon atoms.
R″ represents an alkyl, alkoxy, alkenyl or alkynyl group containing fewer than 5 carbon atoms.
M represents an $NH_2$, $CN$ or $NO_2$ group and $y$ is an integer chosen between 0 and 2.

The phenyl ring directly connected to the nitrogen can carry one or more substituents selected from the halogens and/or groups such as: alkyl, alkoxy, alkenyl, alkynyl, nitro groups.

The compounds defined above can be prepared by various synthetic methods. Generally speaking, there is first of all prepared a substituted urea by causing the reaction, in the presence of a solvent, of a substituted amine

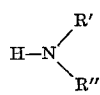

with an isocyanate

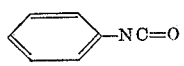

By direct condensation, there is obtained:

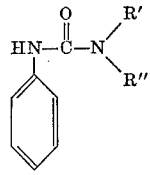

Finally, the substituted urea is for example condensed with an aromatic acid chloride carrying the required substituents; the condensation is effected with elimination of hydrochloric acid.

It is possible to run a benzene solution of the acid chloride, particularly benzoyl chloride, into a suspension of the substituted urea in benzene and then to heat the said suspension to boiling point for eliminating the hydracid. It is more convenient to operate in the presence of an acid acceptor, such as dimethylamine, trimethylamine, triethylamine, morpholine or pyridine.

According to a preferred method of preparation, the acid acceptor is itself used as solvent of the reaction mass by using a large excess with respect to the stoichiometric quantity. For example, one mole of substituted urea is dissolved in 1500 cc. of pyridine. The acid chloride is run in quickly within 10 to 15 minutes, while keeping the temperature in the region of 35 to 40° C. The mixture is then stirred for 3 to 4 hours at 35 to 40° C. After standing for 24 hours, a dilute and cooled solution of a mineral acid is added. The formation of oily droplets is observed, these gradually collecting in the solid state. After centrifuging, washing with water until neutral and drying, the dry crude product is triturated with petroleum ether in order to completely remove the acid chloride and the pyridine, and then the product is dried.

The substituted ureas according to the invention are generally white, solid substances having an appreciable solubility in the conventional organic solvents such as methanol, ethanol, acetone, cyclohexanone, or in solvents such as dimethylformamide or dimethyl sulfoxide.

The following table gives, by way of example, the conditions used in the preparation of several derivatives originating from the reaction of aromatic acid chlorides on N-(3,4-dichlorophenyl)-N′, N′-dimethylurea, the general formula of the tetrasubstituted ureas referred to being the following:

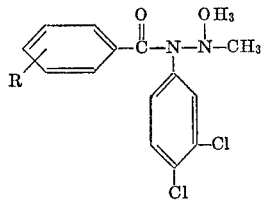

R having the meaning which is attributed to it in the following Table I:

TABLE I

| Ex. | Trisubstituted urea, number of mols | Acid chloride Number of mols | R | Yield calculated on urea and chloride, percent | Melting point, ° C. |
|---|---|---|---|---|---|
| 1 | 0.1 | 0.1 | H | 87.9 | 107–110 |
| 2 | 0.107 | 0.107 | 2-Cl | 75.7 | 99 |
| 3 | 0.137 | 0.137 | 4-Cl | 94.7 | 102–106 |
| 4 | 0.896 | 0.896 | 4-O-CH₃ | 94 | 132–135 |
| 5 | 0.1 | 0.1 | 4-NO₂ | 89.7 | 124–130 |
| 6 | 0.1 | 0.1 | 3,4,5-OCH₃ | 96.0 | 120–125 |
| 7 | 0.1 | 0.1 | 2-CH₃ 4-O-CH₃ | 92.3 | 115–120 |
| 8 | 0.1 | 0.1 | 3-CH₃ 4-O-CH₃ | 89 | 125–130 |

EXAMPLE 9

The N-benzoyl-N-(3,4-dichlorophenyl)-N′,N′-diethylurea is obtained from the reaction of benzoyl chloride (0.1 mol) on N-(3,4-dichlorophenyl)-N',N'-diethylurea (0.1 mol).

The yield obtained is 93.4% and the melting point of this benzoyl urea is from 114–117° C.

EXAMPLE 10

The N - (4-methoxybenzoyl)-N-(3,4-dichlorophenyl)-N',N'-diethylurea is obtained from the reaction of 4-methoxybenzoyl chloride (0.1 mol) on N-(3,4-dichlorophenyl)-N',N'-diethylurea (0.1 mol).

The yield obtained is 93.6% and the melting point is 88–92° C.

EXAMPLE 11

The N - (4-methoxybenzoyl)-N-(3,4-dichlorophenyl)-N'-methyl-N'-butylurea is produced by the reaction of 4-methoxybenzoyl chloride (0.05 mol) on N-(3,4-dichlorophenyl)-N'-methyl-N'-butylurea (0.05 mol).

The yield obtained is 85.8% and the melting point is 84–86° C.

EXAMPLE 12

The N - benzoyl-N-phenyl-N',N'-dimethylurea is produced by the reaction of benzoyl chloride (1.04 mols) on N-phenyl-N',N'-dimethylurea (1.04 mols).

The yield obtained is 53.4% and the melting point is 184–185° C.

EXAMPLE 13

The N-benzoyl - N - (4-chlorophenyl)-N',N'-dimethylurea is produced by the reaction of benzoyl chloride (0.9 mol) on N - (4-chlorophenyl)-N',N'-dimethylurea (0.9 mol).

The yield obtained is 84.8% and the melting point is 125–126° C.

The products indicated in the following Table II are examples of herbicidal products which conform to the general Formula 1 and which can be prepared by the process which has just been described:

TABLE II

| Nature of the substituent or substituents of the benzoyl ring | Nature of the substituent(s) of the phenyl ring | Nature of— | |
|---|---|---|---|
| | | R' | R" |
| Unsubstituted | Unsubstituted | Methyl | Methyl |
| Do | do | do | Methoxy |
| 3-methyl-4-methoxy | do | do | Methyl |
| 2-chloro | do | do | Methyl |
| Unsubstituted | 3,4-dichloro | do | Do |
| 2,5-dichloro | Unsubstituted | do | Do |
| 2,3,6-trichloro | 4-chloro | H | Do |
| 2,3,5,6-tetrachloro | 3,4-dichloro | Ethyl | Ethyl |
| 3-nitro-2,5-dichloro | 3-chloro-4-methoxy | Methyl | Butyl |
| 2,3-dichloro-6-methyl | 3-nitro-4-methyl | do | Propyl |
| 2-methyl-3,6-dichloro | 3-nitro-4-chloro | do | Methyl |
| 3-amino-2,5-dichloro | Unsubstituted | do | Methoxy |
| 2-chloro | 3,4-dichloro | do | Isobutynyl |
| 3-chloro | do | do | Do |
| 4-chloro | do | do | Allyl |
| 3,4-dichloro | 4-propynyl | do | Methyl |
| 4-methoxy | 3,4-dichloro | do | Do |
| 3-methyl | 4-chloro | do | Do |
| 4-ethoxy | 3,4-dichloro | do | Methoxy |
| 2-methoxy-3,5-dibromo | 3-nitro | do | Methyl |
| 2-amino-3,5-dichloro | 3-chloro-4-methoxy | do | Isopropyl |
| 2,6-dimethoxy-3-chloro | 4-chloro | H | Methyl |
| 3-methoxy-2,6-dichloro | 3,4-dichloro | Methyl | Ethyl |
| 2-methoxy-3-methyl-5-chloro | 3-nitro | do | Methoxy |
| 2-methoxy-3,5-dinitro | 4-bromo | do | Propoxy |
| 2-amino-3,5,6-trichloro | 4-propoxy | H | Methyl |
| 2-ethoxy-3,5-dichloro | Unsubstituted | Methyl | Ethoxy |
| 2-methoxy-6-methyl-3,5-dichloro | do | do | Methyl |
| 2-methoxy-3-nitro-5-chloro | 4-chloro | do | Ethyl |
| 3-chloro-4-methoxy | 3,4-dichloro | do | Methyl |
| 4-butynyl | do | do | Do |
| 3-chloro-4-propynyl | do | do | Do |
| 2,3,4-trimethyl-6 chloro | 3-chloro-4-methyl | do | Do |
| 4-nitro | 3,4-dichloro | do | Do |
| 4-cyano | do | do | Do |
| 3,4,5-trimethoxy | do | do | Do |

The new substituted ureas which form the subject of the present invention are endowed with outstanding herbicidal properties. They destroy undesirable weeds, brushwood and shrubs. Employed in smaller quantities, they act as growth regulators. Consequently, they are products which have a very high flexibility in use and the possibilities of the application thereof vary very considerably according to the chemical nature and the quantity of the herbicidal compound being used. Such herbicides can be used either before crop seeding or crop planting (pre-planting treatment) or after crop seeding or crop planting but before crop emergence (pre-emergence treatment) or after crop emergence (post-emergence treatment) and before or after weed emergence and in a general manner at the most suitable stage of growth, depending on the problem to be overcome and the nature of the cultivated plants.

One of the most interesting properties of the numerous substituted ureas according to the invention is the highly specific character of their action on the plants.

It will be seen from the following examples that this new series of compounds is capable of destroying certain dicotyledonous weeds without harming cultivated dicotyledonous plants, and of destroying certain graminaceous weeds in cultivated cereals (wheat, barley, oats, maize), which are also graminaceous plants.

Another important characteristic of the herbicides of this type is the persistence of their action. Many of them are capable of preventing weed germination for several weeks to several months, depending on the chemical nature of the compounds and the quantity being used.

This persistence in the efficacy represents an important advantage, since it prevents in practice the appearance of weeds throughout the entire culture period.

The substituted ureas according to the invention can be used separately or in admixture, in the form of solutions, of emulsions of the oil-in-water or water-in-oil types, suspensions, powders or granulated materials. The solid forms are generally provided by a mixture of the active substance with a solid support in powder form. The powders or emulsions can contain very varying proportions of the active product, which may extend for example from 0.02% to 95%.

The adjuvants necessary for the different types of formulations containing at least one substituted urea according to the invention may themselves be either neutral with respect to the plants or, on the contrary, have a toxic action in themselves, which may be an advantage, particularly in the case of non-selective weed control.

These active adjuvants may be either solid, as for example borates or sodium chloride, or liquid, such as the derivatives of coal tar, simple or substituted phenols, petroleum derivatives.

The adjuvants which are included in the formula may also be formed by fertilizers, which are particularly employed as a support in the case of powders and granules, and possibly with solutions, emulsions or suspensions.

On the other hand, and in accordance with the invention, it may be very interesting in certain cases to use in conjunction with the new products and in addition to the aforesaid agents, one or more known herbicides which increase the spectrum of herbicidal activity, either by the fact of a synergy due to the association of two or more active materials, or simply by the fact of obtaining an increased herbicidal polyvalence.

In association with the products according to the invention, it is possible to apply herbicides of very different chemical structure and biological activity, such as: nitrophenols, chlorophenols, substituted aryloxycarboxylic acids, polychlorophenyl-acetic acids, halogenated alkylcarboxylic acids, substituted carbamates, thiocarbamates and thiolcarbamates, aminotriazole, substituted ureas, derivatives of triazine, quaternary ammonium derivatives, maleic hydrazide and also mineral herbicides: bichromates, chlorates, borates, sodium arsenite, cyanates, ammonium sulfamate, etc.

In general, the substituted ureas of the present invention are used in quantities which vary from 0.5 kg. to 20 kg. per hectare, depending on the intended purpose, the type of application, the nature of weeds to be destroyed and their stage of growth, and the persistence which is desired of the herbicidal action.

The following examples clearly show the highly selective action of the substituted ureas which form the subject of the invention.

Among the numerous possible compounds, there have been chosen the derivatives of simple formula, carrying substituents of various types on the benzoyl group. These examples do not have any limiting character, and all the compounds corresponding to the general formula are endowed with herbicidal properties.

The compounds used in the following examples are:

(A) 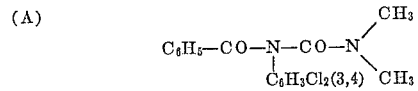

(B) 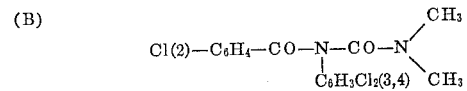

(C) 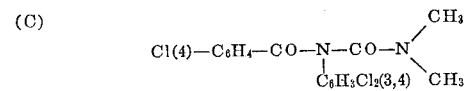

(D) 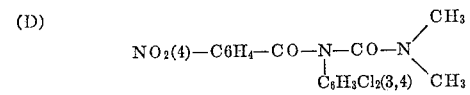

(E) 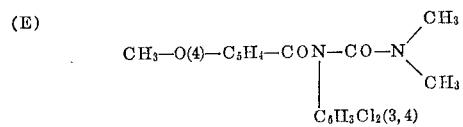

(F) 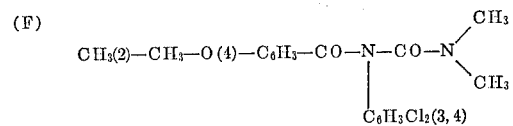

(G) 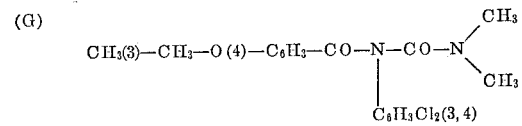

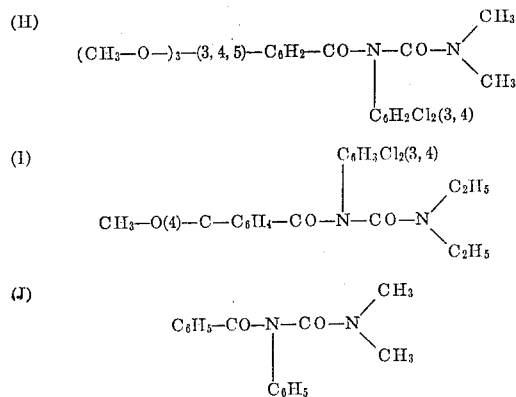

The biological tests were carried out in a greenhouse, testing each of the ureas of Examples A to J in generally 3 dosage rates as specified in the following tables, and in accordance with two treatment techniques:

(a) Pre-emergence treatment, that is to say, after seeding and before plant emergence (Tables III, IV, and V) and (b) Post-emergence treatment, that is to say, after emergence, when each species is in the state of a seedling of a height varying with the species, and between 5 to 10 cm. (Tables VI, VII and VIII).

Each herbicide was tested after having been suitably formulated as a suspension in water, obtained from a wettable powder to 50% with active material.

The results set out in the following tables mention for each test plant the percentage kill obtained with each urea in its various rates, expressed in kg. to the hectare of active material.

The different species of test plants specified in each table comprise dicotyledonous and graminaceous species.

TABLE III.—PERCENTAGE KILL OF DIFFERENT TEST PLANTS CULTIVATED IN GREENHOUSE AND SUBJECTED TO PRE-EMERGENCE TREATMENT WITH VARIOUS BENZOYL UREAS. (RESULTS EXPRESSED 30 DAYS AFTER TREATMENT)

[Quantity used: 1 kg./ha. of active substance]

| Nature of the test plants | Reference of the various benzoyl ureas | | | | | | | | | |
|---|---|---|---|---|---|---|---|---|---|---|
|  | A | B | C | D | E | F | G | H | I | J |
| Wheat (Triticum vulgare) | 10 | 0 | 0 | 90 | 15 | ---- | 0 | 0 | 0 | 0 |
| Barley (Hordeum distichum) | 5 | 0 | 0 | 5 | 10 | ---- | 5 | 0 | 0 | 0 |
| Oats (Avena sativa) | 5 | 0 | 0 | 5 | 10 | ---- | 15 | 0 | 0 | 0 |
| Maize (or Field Corn) (Zea mays) | 0 | 0 | 0 | 25 | 0 | ---- | 0 | 0 | 0 | 0 |
| Wild Oats (Avena fatua) |  |  |  |  |  |  |  |  |  | 0 |
| Barnyard grass (Echinochloa crusgalli) | 95 |  |  |  | 75 | ---- | 55 |  | 0 | 0 |
| Rye-grass (Lolium italicum) | 100 | 40 | 0 | 90 | 100 | ---- | 100 | 90 | 0 | 70 |
| Black-grass (Alopecurus myosuroides) | 65 |  |  |  | 60 | ---- | 45 |  | 0 | 30 |
| Millet (Panicum miliaceum) | 100 | 100 | 60 | 100 | 100 | 90 | 100 | 100 | 0 | 0 |
| Flax (Linum usitatissimum) | 40 | 0 | 0 | 75 | 80 | ---- | 0 | 60 | 0 | 55 |
| Buckwheat (Polygonum fagopyrum) | 90 |  |  |  | 75 | ---- | 60 |  | 0 | 90 |
| Turnip (Brassica napus) | 95 | 0 | 0 | 98 | 100 | 10 | 100 | 90 | 10 | 65 |
| Tomato (Solanum esculentum) | 80 |  |  |  | 90 | ---- | 100 |  | 0 | 5 |
| Peas (Pisum sativum) | 0 | 0 | 0 | ---- | 0 | ---- | 0 | ? | 0 | 0 |

TABLE IV.—PERCENTAGE KILL OF DIFFERENT TEST PLANTS CULTIVATED IN GREENHOUSE AND SUBJECTED TO PRE-EMERGENCE TREATMENT WITH VARIOUS BENZOLY UREAS (RESULTS EXPRESSED 30 DAYS AFTER TREATMENT)

[Quantity used: 2 kg./ha. of active substance]

| Nature of the test plants | Reference of the various benzoyl ureas | | | | | | | | | |
|---|---|---|---|---|---|---|---|---|---|---|
|  | A | B | C | D | E | F | G | H | I | J |
| Wheat | 100 | 10 | 0 | 90 | 100 |  |  | 20 | 0 | 0 |
| Barley | 95 | 25 | 0 | 0 | 100 |  |  | 0 | 0 | 0 |
| Oats | 98 | 5 | 0 | 20 | 100 |  |  | 0 | 0 | 0 |
| Maize (or Field Corn) | 15 | 0 | 0 | 60 | 5 |  |  | 40 | 0 | 0 |
| Wild Oats |  |  |  |  |  |  |  |  |  | 0 |
| Barnyard grass | 100 |  |  |  | 100 |  |  |  | 0 | 0 |
| Rye-grass | 100 | 100 | 5 | 100 | 100 |  |  | 100 | 0 | 90 |
| Black-grass | 90 |  |  |  | 85 |  |  |  | 0 | 90 |
| Millet | 100 | 100 | 95 | 100 | 100 | 100 |  | 100 | 0 | 10 |
| Flax | 98 | 0 | 0 | 80 | 100 |  |  | 60 | 0 | 70 |
| Buckwheat | 100 |  |  |  | 100 |  |  |  | 0 | 100 |
| Turnip | 100 | 30 | 8 | 100 | 100 | 75 |  | 100 | 20 | 85 |
| Tomato | 80 |  |  |  | 100 |  |  |  | 0 | 30 |
| Pea | 0 | 0 | 0 | ---- | 0 |  |  | ? | 0 | 0 |

TABLE V.—PERCENTAGE KILL OF DIFFERENT TEST PLANTS CULTIVATED IN GREENHOUSE AND SUBJECTED TO PRE-EMERGENCE TREATMENT WITH VARIOUS BENZOYL UREAS. RESULTS EXPRESSED 30 DAYS AFTER TREATMENT)

[Quantity used: 4 kg./ha. of active substance]

| Nature of the test plants | Reference of the various benzoyl ureas | | | | | | | | |
|---|---|---|---|---|---|---|---|---|---|
| | A | B | C | D | E | F | G | H | I | J |
| Wheat | 100 | 20 | 0 | 100 | 100 | | | 40 | 0 | 0 |
| Barley | 100 | 60 | 0 | 80 | 100 | | | 10 | 0 | 0 |
| Oats | 100 | 15 | 5 | 90 | 100 | | | 15 | 0 | 10 |
| Maize (or Field Corn) | 50 | 100 | 0 | 98 | 90 | | | 98 | 0 | 0 |
| Wild Oats | | | | | | | | | | 0 |
| Barnyard grass | 100 | | | | 100 | | | | 0 | 20 |
| Rye-grass | 100 | 100 | 20 | 100 | 100 | | | 100 | 0 | 100 |
| Black-grass | 100 | | | | 100 | | | | 0 | 100 |
| Millet | 100 | 100 | 95 | 100 | 100 | 95 | | 100 | 0 | 20 |
| Flax | 100 | 30 | 0 | 100 | 100 | | | 50 | 0 | 75 |
| Buckwheat | 100 | | | | 100 | | | | 0 | 100 |
| Turnip | 100 | 100 | 10 | 100 | 100 | 90 | | 100 | 95 | 100 |
| Tomato | 100 | | | | 100 | | | | 0 | 80 |
| Pea | | 0 | 0 | | 0 | | | | ? | 0 |

TABLE VI.—PERCENTAGE KILL OF DIFFERENT TEST PLANTS CULTIVATED IN GREENHOUSE AND SUBJECTED TO POST-EMERGENCE TREATMENT WITH VARIOUS BENZOYL UREAS (RESULTS EXPRESSED 30 DAYS AFTER TREATMENT)

[Quantity used: 1 kg./ha. of active substance]

| Nature of the test plants | Reference of the various benzoyl ureas | | | | | | | | |
|---|---|---|---|---|---|---|---|---|---|
| | A | B | C | D | E | F | G | H | I |
| Wheat | 0 | 0 | 0 | 40 | 0 | 0 | 0 | 0 | 0 |
| Barley | 0 | 0 | 0 | 10 | 0 | 0 | 0 | 9 | 0 |
| Oats | 5 | 0 | 0 | 15 | 0 | 0 | 0 | 0 | 0 |
| Maize or Field Corn | 0 | 0 | 0 | 10 | 0 | 0 | 0 | 0 | 0 |
| Wild Oats | 5 | 0 | 0 | | 0 | 0 | 0 | 0 | 0 |
| Barnyard grass | 75 | 0 | 0 | | 90 | 0 | 0 | 0 | 0 |
| Rye-grass | 100 | 0 | 0 | 100 | 100 | 0 | 0 | 0 | 0 |
| Black-grass | 70 | 0 | 0 | | 75 | 0 | 0 | 0 | 0 |
| Millet | 95 | 0 | 60 | 98 | 98 | 0 | 0 | 0 | 0 |
| Flax | 45 | 0 | 0 | 100 | 0 | 0 | 0 | 0 | 0 |
| Buckwheat | 90 | 0 | 0 | | 100 | 0 | 0 | 0 | 0 |
| Turnips | 75 | 0 | 0 | 10 | 75 | 0 | 0 | 0 | 0 |
| Tomatoes | 75 | | 0 | | 75 | 0 | 0 | 0 | 0 |
| Peas | ? | 0 | 0 | | ? | 0 | 0 | 0 | 0 |

TABLE VII.—PERCENTAGE KILL OF DIFFERENT TEST PLANTS CULTIVATED IN GREENHOUSE AND SUBJECTED TO POST-EMERGENCE TREATMENT WITH VARIOUS BENZOYL UREAS (RESULTS EXPRESSED 30 DAYS AFTER TREATMENT)

[Quantity used: 2 kg./ha. of active substance]

| Nature of the test plants | Reference of the various benzoyl ureas | | | | | | | | |
|---|---|---|---|---|---|---|---|---|---|
| | A | B | C | D | E | F | G | H | I |
| Wheat | 50 | 0 | 0 | 70 | 40 | 0 | 5 | 0 | 0 |
| Barley | 5 | 0 | 0 | 10 | 5 | 10 | 20 | 0 | 0 |
| Oats | 40 | 0 | 0 | 25 | 40 | 5 | 5 | 5 | 0 |
| Maize or Field Corn | 5 | 0 | 0 | 30 | 0 | 0 | 0 | 0 | 0 |
| Wild Oats | 50 | 0 | 0 | | 50 | 0 | 0 | 0 | 0 |
| Barnyard grass | 100 | 0 | 0 | | 98 | 75 | 40 | 65 | 0 |
| Rye-grass | 98 | 98 | 0 | 100 | 100 | 95 | 90 | 75 | 80 |
| Black-grass | 85 | 35 | 0 | | 95 | 50 | 40 | 20 | 0 |
| Millet | 95 | ? | 0 | 95 | 98 | 80 | 80 | 75 | 0 |
| Flax | 70 | 0 | 0 | 100 | 5 | 50 | 60 | 30 | 0 |
| Buckwheat | 98 | 70 | 0 | | 100 | 70 | 35 | 95 | 85 |
| Turnip | 85 | 50 | 0 | 40 | 90 | 90 | 85 | 80 | 85 |
| Tomatoes | 70 | 50 | 0 | | 90 | 15 | 15 | 65 | 75 |
| Peas | ? | ? | 0 | | ? | ? | ? | ? | ? |

TABLE VIII.—PERCENTAGE KILL OF DIFFERENT TEST PLANTS CULTIVATED IN GREENHOUSE AND SUBJECTED TO POST-EMERGENCE TREATMENT WITH VARIOUS BENZOYL UREA (RESULTS EXPRESSED 30 DAYS AFTER TREATMENT)

[Quantity used: 4 kg./ha. of active substance]

| Nature of the test plants | Reference of the various benzoyl ureas | | | | | | | | |
|---|---|---|---|---|---|---|---|---|---|
| | A | B | C | D | E | F | G | H | I |
| Wheat | 80 | 0 | 5 | 90 | 50 | 0 | 40 | 5 | 0 |
| Barley | 80 | 0 | 0 | 40 | 98 | 50 | 20 | 20 | 0 |
| Oats | 80 | 0 | 0 | 40 | 98 | 40 | 5 | 95 | 0 |
| Maize or Field Corn | 25 | 0 | 0 | 90 | 15 | 10 | 5 | 5 | 0 |
| Wild Oats | 94 | 0 | 0 | | 100 | 50 | 5 | 20 | 0 |
| Barnyard grass | 100 | 80 | 20 | | 98 | 80 | 60 | 95 | 10 |
| Rye-grass | 100 | 100 | 98 | 100 | 100 | 100 | 85 | 90 | 80 |
| Black-grass | 95 | 55 | 35 | | 98 | 75 | 75 | 40 | 10 |
| Millet | 98 | 95 | 90 | 100 | 100 | 75 | 50 | 95 | 0 |
| Flax | 85 | 0 | 5 | 100 | 85 | 50 | 50 | 70 | ? |
| Buckwheat | 100 | 80 | 40 | | 90 | 70 | 50 | 100 | 85 |
| Turnips | 100 | 90 | 55 | 90 | 98 | 70 | 75 | 100 | 90 |
| Tomatoes | 60 | 70 | 60 | | 98 | 30 | 15 | 60 | 60 |
| Peas | 100 | ? | ? | | ? | ? | ? | ? | 5 |

Examples of field plot tests

Benzoyl ureas according to the invention, such as: N-benzoyl-N-(3,4-dichlorophenyl)-N',N'-dimethylurea, which is the product A of the preceding examples, sprayed on field corn as a pre-emergence treatment at the rate of 2 kg. per hectare, while leaving the cultivated plants completely unaffected, kills the following weed species: Amarantus spp., Chenopodium spp., Raphanus raphanistrum, Sinapis arvensis, Polygonum persicaria and P. convolvulus, Eichinachloa crus-galli and Digitaria sanguinalis.

The N-benzoyl-N-phenyl-N',N'-dimethylurea, which is the product J of the preceding examples, applied as a pre-emergence treatment of winter wheat at a rate of 1.5 kg./ha., is completely selective on wheat and enables the following species of plant to be destroyed: Alopecurus myosuroides, Agrostis spica-venti, Matricaria spp., Stellaria media, Papaver spp., Sinapis arvensis, Galeopsis tetrahit.

N-(2-chlorobenzoyl)-N-(3,4-dichlorophenyl)-N,N'-dimethylurea, which is the product B of the preceding examples, applied to flax at a height of 5 cm., is found to be perfectly well tolerated, whereas the seedlings of the following weed species are destroyed: Raphanus raphanistrum, Sinapis arvensis, Chenopodium album, Centaurea cyanus, Polygonum convolvulus.

N-(4-methoxybenzoyl)-N-(3,4-dichlorophenyl)-N',N'-dimethylurea, used at the rate of 10 kg./ha., either in the pre-emergence or in the post-emergence treatment, on weed seedlings, is found to be a herbicide capable of destroying a large number of annual dicotyledonous and graminaceous species, while effectively limiting the growth of certain perennnial species, such as: Erigeron canadense, Polygonum aviculare, Festuca spp., Lolium spp., Matricaria spp., Solanum nigrun, Datura stramonium, Cirsium arvense, Convolvulus arvensis.

N-benzoyl-N-phenyl-N',N'-dimethylurea, applied for weed control in orchards (apple and pear trees) and vineyards is found to be completely safe with an annual amount of 5 kg. per hectare and a such rate is effective for controlling various annual kinds of weeds.

The addition to the aforesaid substituted urea of 2.8 kg. per hectare of 3-amino-1,2,4-triazole at the same time, because of a synergistic effect between the two herbicides permits of combating various species of perennial weeds, such as: Cirsium arvense, Convolvulus arvensis, Lepidium draba. In this case of association, the quantity of urea can be lowered to 3.5 kg./ha.

We claim:

1. A process of controlling the growth of plants comprising applying to the habitat of the plants a herbicidally effective amount of a benzoyl urea of the formula

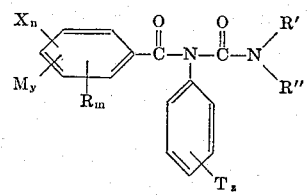

wherein X is a halogen and $n$ is an integer from 0 to 4, R is an alkyl or alkoxy radical containing 1 to 4 carbon atoms, $m$ is an integer between 0 and 3, R' is hydrogen or an alkyl group of 1 to 4 carbon atoms, R" is an alkyl, alkoxy, alkenyl or alkynyl group of not over 4 carbon atoms, M is $NH_2$, CN or $NO_2$, $y$ is a number from 0 to 2, T is halogen, lower alkoxy of 1 to 3 carbon atoms, nitro, lower alkyl or propynyl, and $z$ is an integer from 0 to 2.

2. A process according to claim 1 wherein the benzoyl urea is an N-(3,4-dichlorophenyl)-N',N'-dimethylurea carrying on its N nitrogen a substituent selected from the group consisting of benzoyl, chlorobenzoyl, nitrobenzoyl, methoxybenzoyl, ethoxybenzoyl, dimethoxybenzoyl, trimethoxybenzoyl, 2-methyl-4-methoxybenzoyl and 3-methyl-4-methoxybenzoyl.

3. A process according to claim 2 characterized in that the quantity of the said benzoyl urea applied per hectare is from 0.5 to 20 kg.

4. A process according to claim 1 wherein the benzoyl urea is an N-(3,4-dichlorophenyl)-N',N'-diethylurea carrying on its N nitrogen a substituent selected from the group consisting of benzoyl, chlorobenzoyl, nitrobenzoyl, methoxybenzoyl, ethoxybenzoyl, dimethoxybenzoyl, trimethoxybenzoyl, 2-methyl-4-methoxybenzoyl and 3-methyl-4-methoxybenzoyl.

5. A process according to claim 4 characterized in that the quantity of the said benzoyl urea applied per hectare is from 0.5 to 20 kg.

6. A process according to claim 1 wherein the benzoyl urea is an N-phenyl-N',N'-dimethylurea carrying on its N nitrogen atom a substituent selected from the group consisting of benzoyl, chlorobenzoyl, nitrobenzoyl, methoxybenzoyl, ethoxybenzoyl, dimethoxybenzoyl, trimethoxybenzoyl, 2-methyl-4-methoxybenzoyl and 3-methyl-4-methoxybenzoyl.

7. A process according to claim 6 characterized in that the quantity of the said benzoyl urea applied per hectare is from 0.5 to 20 kg.

8. A process according to claim 1 wherein the benzoyl urea is an N-phenyl-N',N'-diethylurea carrying on its N nitrogen atom a substituent selected from the group consisting of benzoyl, chlorobenzoyl, nitrobenzoyl, methoxybenzoyl, ethoxybenzoyl, dimethoxybenzoyl, trimethoxybenzoyl, 2-methyl-4-methoxybenzoyl and 3-methyl-4-methoxybenzoyl.

9. A process according to claim 8 characterized in that the quantity of the said benzoyl urea applied per hectare is from 0.5 to 20 kg.

References Cited

UNITED STATES PATENTS

| | | | |
|---|---|---|---|
| 2,762,695 | 9/1956 | Gerjouich et al. | 71—2.6 |
| 2,762,696 | 9/1956 | Gerjouich et al. | 71—2.6 |
| 3,261,865 | 7/1966 | Speziale et al. | 260—553 |
| 2,876,088 | 3/1959 | Hill et al. | 71—120 |
| 3,189,431 | 6/1965 | Salzberg | 71—120 |
| 3,253,902 | 5/1966 | Munz et al. | 71—120 |

LEWIS GOTTS, *Primary Examiner.*

M. M. KASSENOFF, *Assistant Examiner.*